(12) United States Patent
Moharram et al.

(10) Patent No.: US 9,330,417 B2
(45) Date of Patent: May 3, 2016

(54) RECOGNITION SYSTEM

(76) Inventors: Tarek Moharram, London (CA); Andrew Cerio, Canastota, NY (US)

( * ) Notice: Subject to any disclaimer, the term of this patent is extended or adjusted under 35 U.S.C. 154(b) by 671 days.

(21) Appl. No.: 13/463,814

(22) Filed: May 4, 2012

(65) Prior Publication Data

US 2012/0284592 A1 Nov. 8, 2012

Related U.S. Application Data

(60) Provisional application No. 61/483,637, filed on May 6, 2011.

(51) Int. Cl.
*G06F 3/00* (2006.01)
*G06Q 50/00* (2012.01)

(52) U.S. Cl.
CPC ..................................... *G06Q 50/01* (2013.01)

(58) Field of Classification Search
CPC ............ G09B 7/04; G09B 3/00; G06Q 30/02; G06Q 30/0209; G06F 21/629
See application file for complete search history.

(56) References Cited

U.S. PATENT DOCUMENTS

| | | | |
|---|---|---|---|
| 6,688,888 B1* | 2/2004 | Ho et al. | 434/322 |
| 7,801,824 B1* | 9/2010 | Bryar et al. | 705/65 |
| 2007/0124202 A1* | 5/2007 | Simons | 705/14 |
| 2009/0114144 A1* | 5/2009 | Keefe | 116/234 |
| 2012/0089581 A1* | 4/2012 | Gupta | G06Q 30/00 707/706 |
| 2012/0178066 A1* | 7/2012 | Drum | 434/245 |
| 2012/0311438 A1* | 12/2012 | Cranfill | G06F 17/30011 715/256 |

OTHER PUBLICATIONS

Lowensohn, Josh, "Q&A: Foursquare co-creator on privacy, Easter eggs," Apr. 9, 2009, <http://www.cnet.com/news/q-a-foursquare-co-creator-on-privacy-easter-eggs/>, pp. 1-5.*

"Pogo and Facebook Integration," Oct. 20, 2009, <http://www.badgehungray.com/2009/10/20/pogo-and-facebook-integration/>, pp. 1-15.*

* cited by examiner

*Primary Examiner* — Kyle Stork

(57) ABSTRACT

According to various embodiments, a user may pursue defined achievements through reading books. As the user accomplishes the achievements, the user may receive mementos that can serve as a tangible indicator of what the user has accomplished. The mementos may be visible to others on a website, such as a social networking website.

32 Claims, 15 Drawing Sheets

| User 604 | Name 606 | Password 608 | Mobile Device 610 |
|---|---|---|---|
| U09353 | Linda Jones | XX8923 | D13825 |
| U38623 | Sam Green | friedwings | D32556 |
| U23492 | Suzy Smith | BooksRCool | D23262 |

| Memento 704 | Qualification Criteria 706 | Description 708 | Image 710 |
|---|---|---|---|
| M3895 | Complete War and Peace | Image of Book Cover | <Image Data> |
| M3925 | Purchase 3 Kurt Vonnegut books | Stylized Auther's Name | <Image Data> |
| M4690 | Complete chapter 1 of the Odyssey | Picture of a Ship and "1" | <Image Data> |

| Mobile Device 804 | Brand 806 | Model 808 | IP Address 812 |
|---|---|---|---|
| D12491 | Amazon Kindle | M343 | 111.111.111.111 |
| D24523 | Amazon Kindle | M345 | 222.222.222.222 |
| D39521 | Barnes and Noble Nook | ZX112 | 333.333.333.333 |

| Achievement 904 | Description 906 | Prerequisite(s) 908 |
|---|---|---|
| A382395 | Read Three Legal Thrillers | A491225 |
| A456789 | Read Nine Pulitzer Prize Winners | A353532, A236634 |
| A984622 | Read 1 Book By John Grisham | none |
| A984622 | Read 4 Chapters of Pride and Prejudice | none |

| Book 1004 | Title 1006 | Author 1008 | Classification 1010 |
|---|---|---|---|
| B142423 | The Family from Reno | Frank White | Horror, Fiction |
| B156346 | Woodland Habitats | Hilda Vanter | Non-fiction |
| B235267 | The End of Politics | Nathan Clement | Politics |
| B356363 | Five Years of Contemplation | William Chaseman | Spiritual |

| User 1104 | Name 1106 | Friends 1108 | Library Source 1110 |
|---|---|---|---|
| US35235 | Robert Fishtail | US52332, US35235,... | 433.523.366.332 |
| US39523 | Manny Thomson | US90933, US32028,... | 433.523.366.332 |
| US45923 | Claire Werstein | US72390, US20462,... | 124.352.254.577 |
| US63042 | Samantha Portsmith | US49309, US23511,... | 118.390.272.323 |

| Book 1204 | Current Place 1206 | Last Read 1208 | Quiz Questions Answered 1210 | Content 1212 |
|---|---|---|---|---|
| B142423 | Page 46 | May 6, 2013 | 12 | <Data> |
| B156346 | Chapter 8 | April 4, 2013 | 3 | <Data> |
| B235267 | Complete | May 10, 2013 | 21 | <Data> |
| B356363 | Chapter 12 | May 23, 2013 | 35 | <Data> |

Figure 12

| Memento 1304 | Date Earned 1306 | Appearance 1308 |
|---|---|---|
| M3622 | January 23, 2012 | <Data> |
| M1262 | February 19, 2012 | <Data> |
| M9502 | March 11, 2012 | <Data> |
| M1563 | In progress | <Data> |

RECOGNITION SYSTEM

RELATED APPLICATIONS

The present application claims the benefit of priority of U.S. Provisional Application Ser. No. 61/483,637, entitled "Recognition System", filed May 6, 2011, the entirety of which is incorporated herein for all purposes.

BACKGROUND

Some books are published electronically, and are often called "e-books". Such books may be available for purchase and download via an electronic network. Taking a purely "digital" form, such books may require lower printing and distribution costs, among other things. Further, electronic books may be more readily portable than traditional printed books. E-books may be stored and read on specialized devices called e-readers. E-books may also be stored and read on more general purpose devices, such as tablet computers.

Before the era of e-readers and tablet computers, consumers would purchase physical copies of books for both personal and professional consumption. While many titles were available to be borrowed from a library, many consumers chose to purchase books with the knowledge that they would likely only be read once. A significant factor which contributed to this seemingly uneconomical decision was the consumer interest in showcasing the material he/she had read before others. In other words, the consumer received additional utility from purchasing the book as opposed to simply borrowing it—the benefit of showing others that the book had been read. This additional advantage associated with making the purchase caused consumers to purchase a book which would only be read once and then put on display as both a status symbol to be viewed by others and a means through which the consumer could track his/her own achievements. However, now that electronic means of reading and purchasing written material are available, consumers are currently unable to effectively show others the breadth of their library or monitor their progress towards becoming an avid reader. Notifying friends, family, and coworkers of each and every development within a person's reading life would surely garner a negative response—people do not wish to be inundated with incessant status updates on this subject, and might consider the issuer too forward in touting his/her accomplishments. Since current versions of e-readers have only limited capabilities to connect users through social networking sites, readers must abandon their accomplishments for fear of a negative social response from others.

Thus, in some situations, it may be desirable to provide a reader of an e-book with an alternative memento, demonstrating that the user owns and/or has read a particular e-book.

SUMMARY

Various embodiments pertain to e-readers and social networking applications, though it will be appreciated that various embodiments are not limited to only e-readers or only social networking applications. Various embodiments include 1) creating a system and method of defining and creating achievements based on consumer purchases of e-books and other material readable on an e-reader; 2) recording the individual purchases which result in the achievements; 3) tracking the progress of a consumer as he/she reads an e-book or other similar material; and 4) documenting such individual purchases, achievements, and progress on a user profile which can be linked to a social networking site (e.g., a tab on a user's Facebook page, for instance).

BRIEF DESCRIPTION OF THE FIGURES

FIG. 6 illustrates a user database according to some embodiments.

FIG. 7 illustrates a memento database according to some embodiments.

FIG. 8 illustrates a mobile device database according to some embodiments.

FIG. 9 illustrates an available achievements database, according to some embodiments.

FIG. 10 illustrates a book database according to some embodiments.

FIG. 11 illustrates a user database, according to some embodiments.

FIG. 12 illustrates book database, according to some embodiments.

FIG. 13 illustrates a memento database, according to some embodiments.

DETAILED DESCRIPTION

System

Figure 1:
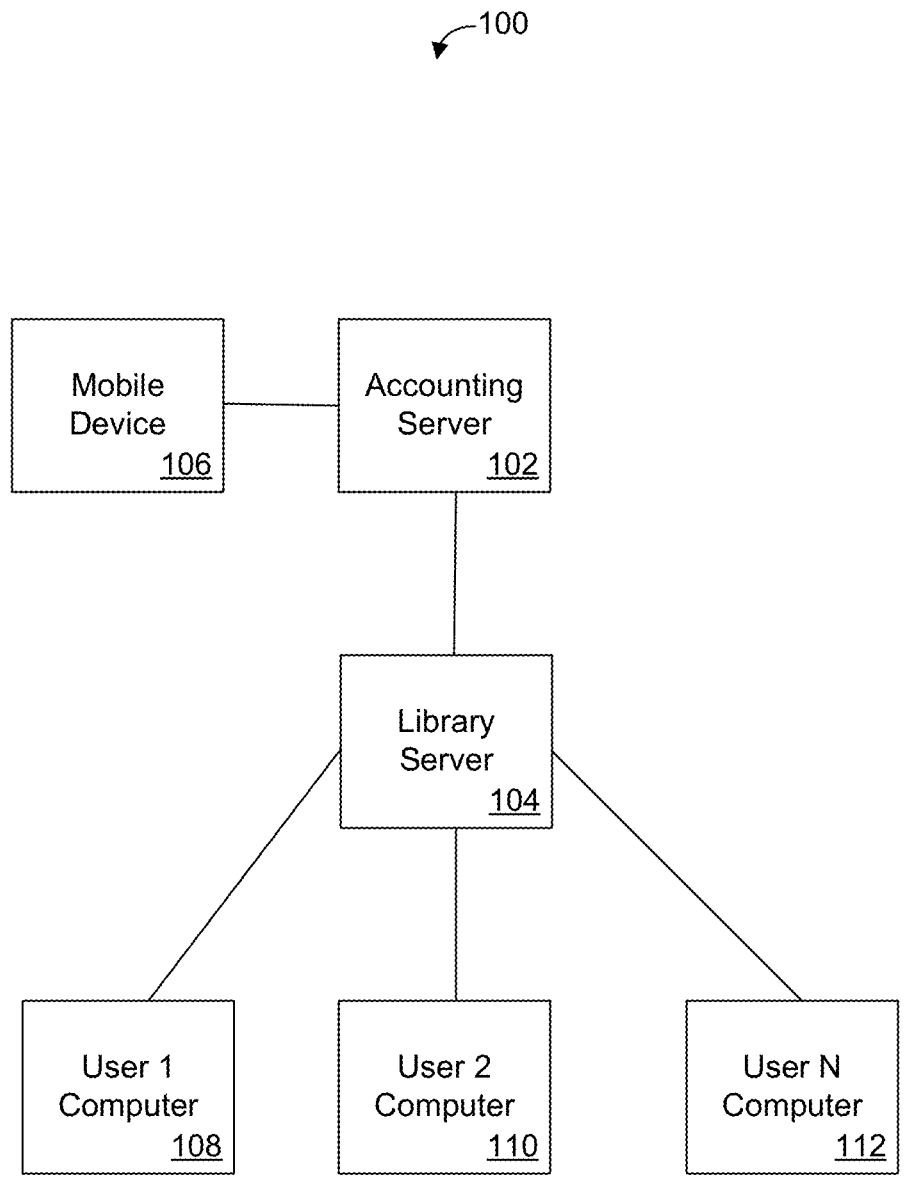
FIG. 1 illustrates a system according to some embodiments.

Referring to FIG. 1, a system 100 according to various embodiments includes an accounting server 102, a memento library server 104, a mobile device 106, and one or more user personal computers ("user pc's") 108, 110, 112.

Accounting Server

Figure 2:
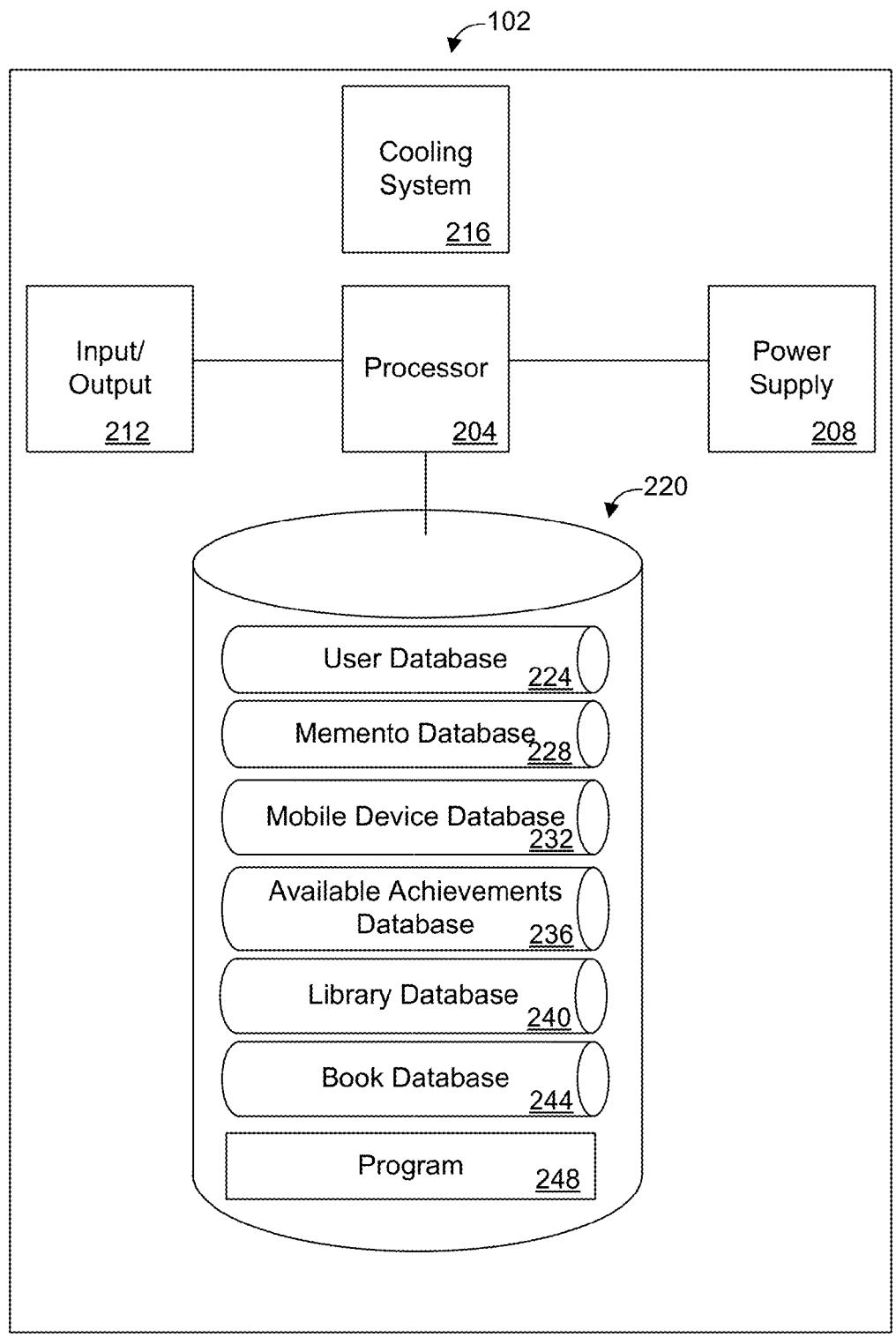
FIG. 2 illustrates an accounting server according to some embodiments.

Referring to FIG. 2, an accounting server 102 may track the progress of one or more users as they read and complete books. The accounting server 102 may include a processor 204, a power supply 208, input and output terminals 212 (e.g., terminals for connecting to a network; e.g., terminals for receiving commands from operators of the server), a cooling system 216, and a memory 220. The memory may store various data. Such data may take the form of databases, in some embodiments. However, as will be appreciated, the serve may store data in any suitable form.

In some embodiments, the accounting server 102 may store a user database 224, a memento database 228, a mobile device database 232, an available achievements database 236, a library database 240, and a book database 244.

In various embodiments, the accounting server may include a program, which may allow the accounting server to carry out instructions and methods in accordance with various embodiments described herein.

In various embodiments, the accounting server may perform one or more of the following: (1) register a user; (2) provide e-book downloads; (3) track a user's progress reading one or more e-books; (4) receive payment for e-books; (5) determine when a user is entitled to recognition and/or to a memento for his progress with e-books; (6) provide the user with recognition and/or mementos of his progress through e-books; (7) provide to one or more additional users an indication that a first user has made a certain amount of progress with one or more e-books. It will be appreciated that a server according to various embodiments may perform one or more additional steps, or fewer steps.

A server may take various forms, according to various embodiments. A server may include one or more servers in communication with each other. A server may include multiple spatially separated components, such as separate processor and memory. A server may be a virtual server, and may be embodied completely in software, in some embodiments. In some embodiments, the functions of a server may be spread across multiple devices. In some embodiments, the functions of a server may reside in a "cloud", which may consist of arbitrary computing resources that are available as needed over a computing network.

In various embodiments, a server may include more or less components than are illustrated in the drawings.

Library Server

Figure 3:
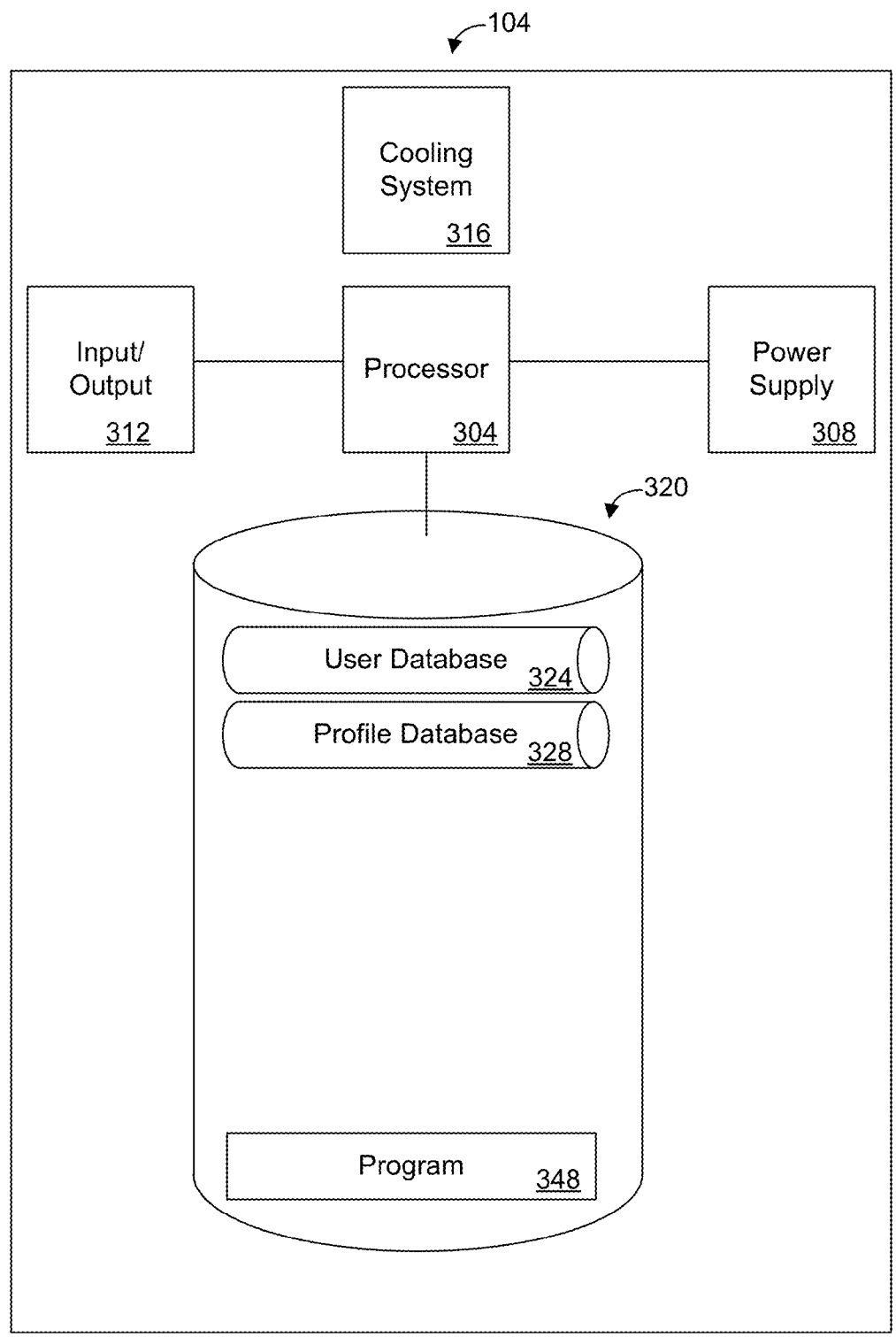
FIG. 3 illustrates a library server according to some embodiments.

An exemplary illustration of a library server is shown in FIG. 3, according to various embodiments. The library server may power a website or web application. The library server may power a social networking site, for example. In various embodiments, the library server may store information about users (e.g., members of a social networking site), and about user profiles (e.g., profiles for members of a social networking site). When a user logs into the library server, the library server may provide for display to the user information from his own profile, and/or information about the profiles of other users (e.g., "friends" or social connections).

In various embodiments, the library server may store a "virtual library" for a user, or other record of books that a user has read. Such information may be stored in association with a user's profile. Thus, for example, if a first user logs in and views the profile of a second user, then the first user may be able to view an indication of the books that have been read by the second user. The virtual library may store information in the form of trophies, mementos, or the like. These may be representations of books that a user has read. For example, a memento may be a small graphical representation of a particular book that a user has read. Thus, a virtual library may consist of an arrangement (e.g., a grid) of mementos that are arranged on a page (e.g., on a web page).

In some embodiments, a user database 324 may store information about users associated with the library server. The users may be account holders of the site associated with the library server, for example. In various embodiments, profile database 328 may store profile information for a user, including name, interests, social connections, images, hobbies, groups, etc.

In some embodiments, the accounting server and the library server may be one and the same.

Mobile Device

Figure 4:
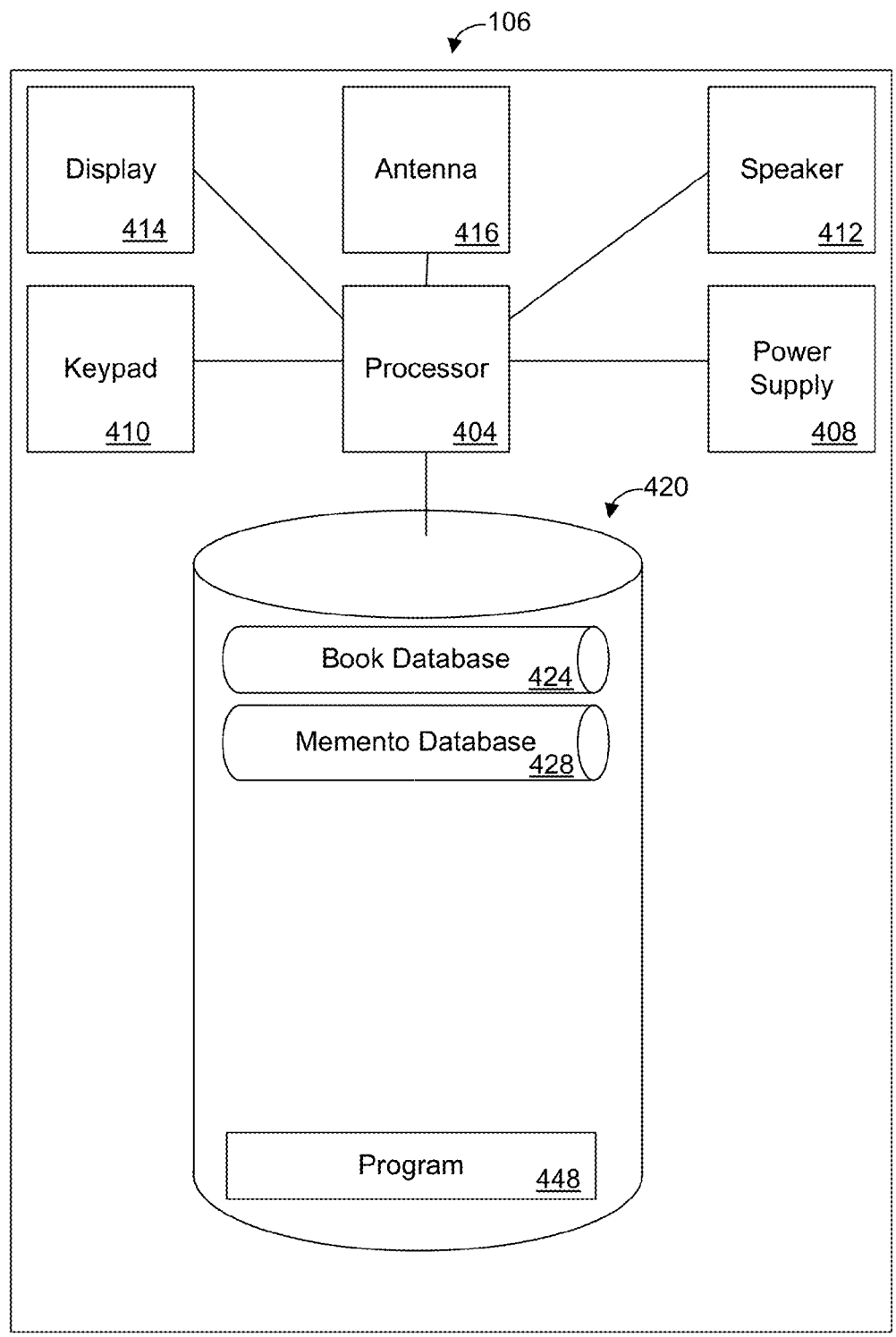
FIG. 4 illustrates a mobile device according to some embodiments.
Figure 5:
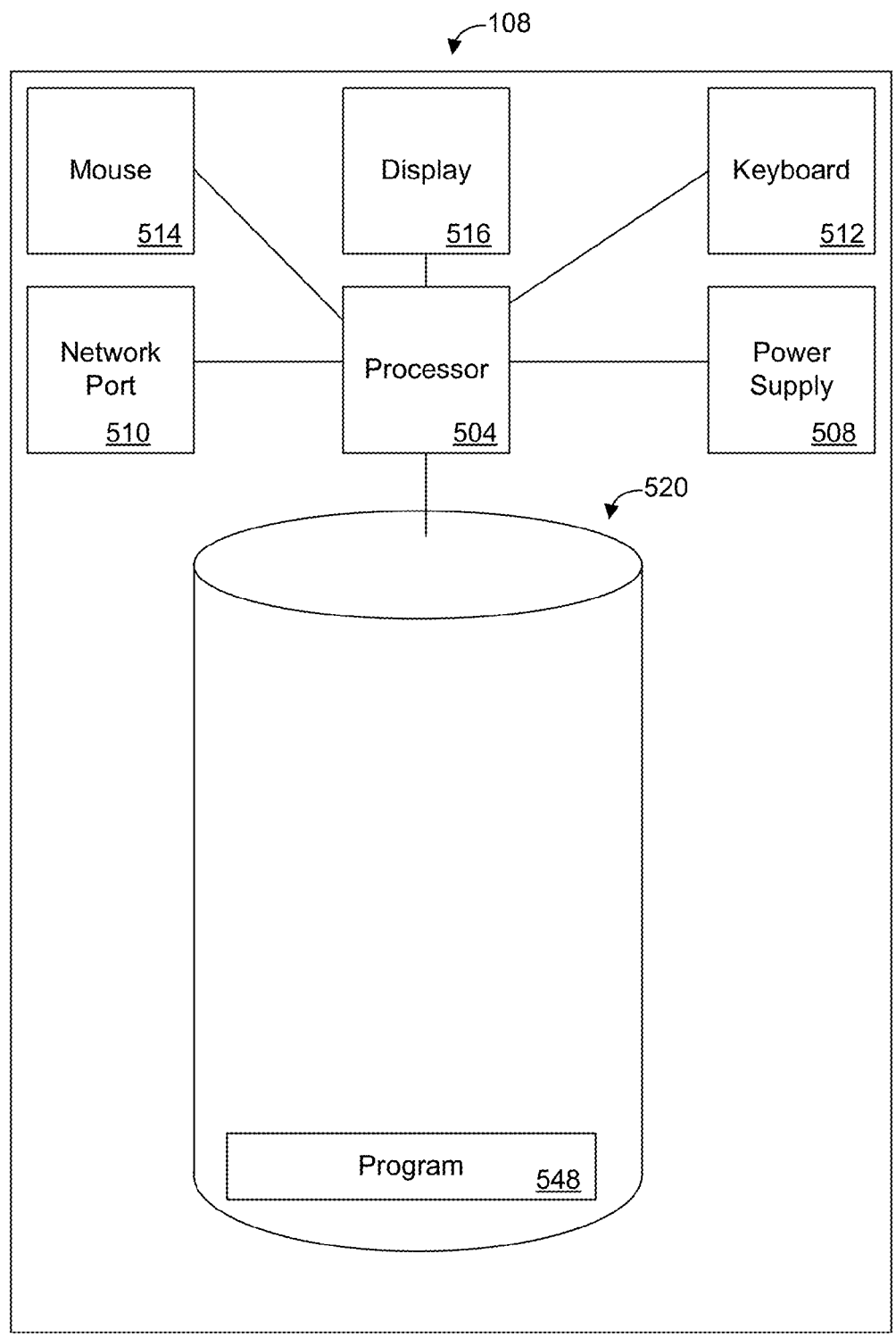
FIG. 5 illustrates a user computer according to some embodiments.
Figure 14:
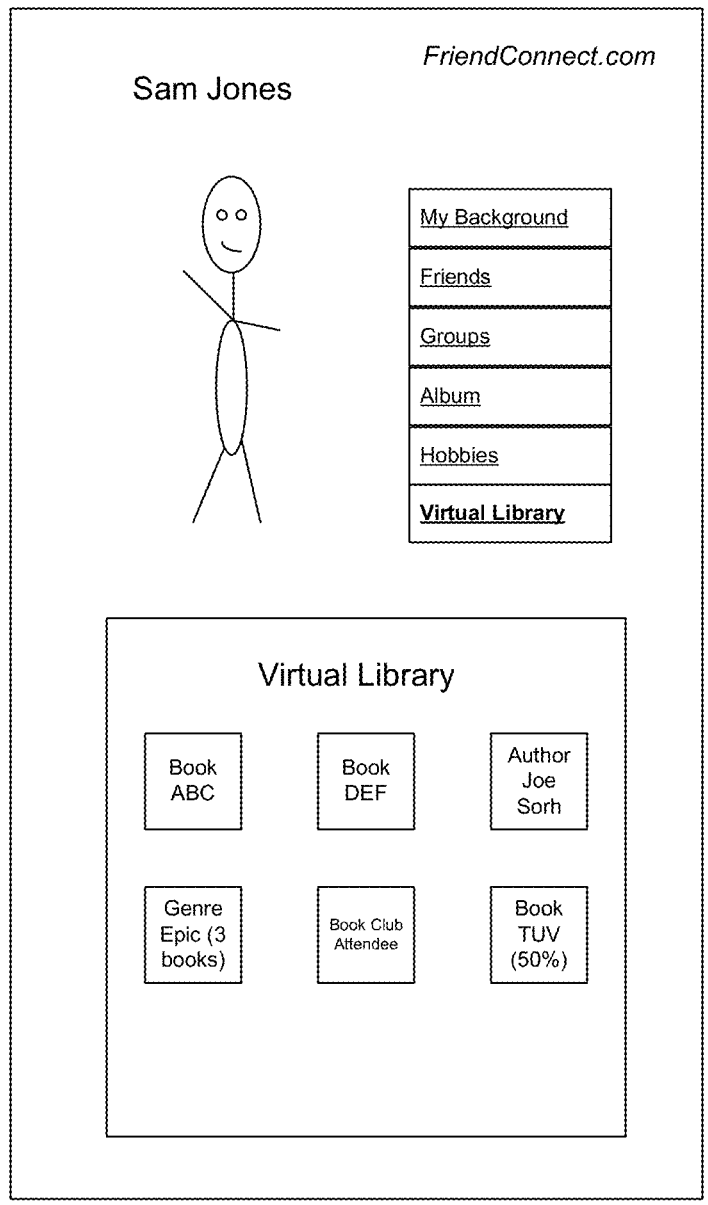
FIG. 14 illustrates an exemplary user profile page, according to some embodiments.

An exemplary mobile device 106 is depicted in FIG. 4. In various embodiments, the mobile device 106 may be an e-reader, such as the Amazon Kindle, the Barnes and Noble Nook, or any other e-reader. In various embodiments, the mobile device may be a tablet computer (e.g., an Apple iPad), a laptop, a smart phone (e.g., Blackberry Pearl, e.g., Apple iPod) a personal digital assistant, a cellular phone, a gaming device, a global positioning system, or any other suitable device.

In various embodiments, the mobile device may be used by a user to accomplish a task for which he is to receive recognition and/or a memento. In some embodiments, a user uses the mobile device to read a book, a portion of a book, a series of books, and/or a series of related books.

It will be appreciated that in some embodiments, a user may accomplish a task on a device other than a mobile device. For example, a user may read an electronic book using his personal computer.

In some embodiments, a mobile device may include a processor 404, power supply 408 (e.g., battery), keypad 410, speaker 412, display 414, antenna 416, and memory 420. It will be appreciated that, in various embodiments, a mobile device may have more or fewer components, and may have more or fewer of each component described. For example, a mobile device may include two displays.

Memory 420 may store various data, and a program 448 that may allow the mobile device 106 to operate according to various embodiments described herein. The memory may store a book database 424 and a memento database 428. The book database may include book information, such as the actual text of one or more e-books. The text may be displayed by the mobile device in order for the user to read the book. The mobile device 106 may also include a memento database 428. The memento database may store mementos that the user has already earned, including the actual graphical depiction of the mementos. The memento database may also store a user's progress through one or more books, or towards earning one more mementos.

User PC

In various embodiments, the user pc may include a home computer, such as a computer manufactured by Dell, Hewlett-Packard, or Apple. It will be appreciated that in various embodiments, a user pc may include any other computing device, including a gaming device (e.g., Microsoft Xbox), a laptop, tablet computer, mobile computing device, and so on.

A user pc may be connected to a network, such as to the Internet. The user may use the user pc to log onto a website, which may include a social networking site (e.g., Facebook, Myspace, etc.). The website may be the website of the library server 102. Through the user pc, a first user may view the profile of a second user, and may, for example, browse through a virtual library of the second user.

In various embodiments, a user may employ the user pc (or any other device) to log into the accounting server. There, in some embodiments, the user may purchase e-books, may view progress towards one or more achievements, or may link his account at the accounting server with an account on the library server. By linking accounts, for example, the user may allow a social networking site to which he belongs, to have access to his record of achievements so as to display them on his profile on the social networking site.

A user pc may include a processor 504, power supply 508, network port 510, keyboard 512, mouse 514, display 516, and memory 520. It will be appreciated that the user pc may have more or fewer components, or more or fewer of each individual component. The program 548 may allow the user pc to operate in accordance with various embodiments described herein.

User Database

With reference to FIG. 6, user database 224 may allow the library server to track users as they purchase, and progress through e-books (or through other reading material or material). Users may have accounts, which may include passwords 608. In some embodiments, a user account is associated with a particular mobile device, which may be stored in field 610. The accounting server may thus, for example, receive communications from a mobile device and may automatically recognize the user with which the mobile device is associated.

Additionally, in some embodiments, upon purchase of a book by a user, the library server may automatically download the book to the mobile device.

In some embodiments, the library server is able to download to a user's mobile device an indication that a user has earned a memento by completing associated criteria or milestones. The library server may automatically download an indication of a memento to a user's mobile device.

Memento Database

Referring to FIG. 7, a memento database 228 may allow the library server to manage mementos. The database may provide indications of the qualification criteria for earning a memento (field 706). Thus, by reference to memento database 228, the library server may determine when a user is deserving of a particular memento. Description field 708 may include a brief summary of what is depicted by the memento. Image field 710 may store the actual graphical representation of the memento, which may be a bitmap, jpeg, vector graphic, or any other suitable representation.

Figure 15:
FIG. 15 illustrates an exemplary memento, according to some embodiments.

In some embodiments, a memento may take the form of stylized text within a small thumbnail representing the author's name. The last name may be in larger print and above the first name (and middle). See, e.g., FIG. 15. Such a memento may memorialize an achievement related to a particular author (e.g., reading 9 of the author's books).

In some embodiments, a memento may take the form of stylized text within a small thumbnail representing the book's title. Such a memento may memorialize an achievement related to a particular genre, for example.

Mobile Device Database

Referring to FIG. 8, the mobile device database 232 may include various information about mobile devices, including devices that may be owned by users. The brand field 806 may, for example, allow the accounting server to tailor the format of a book download that is provided in order to be displayable on the particular device. The model field 808 may serve a similar function. In some embodiments, the accounting server may determine an appropriate form for a memento based on brand, model, and one or more other criteria. For example, if it is known that a particular brand of e-reader is green, then the library server may avoid sending mementos in the color green.

The IP address field 812 may provide the accounting server with a reference address to which to send books, and send mementos. The IP address may also allow the library server to automatically recognize a user based on the origin of transmissions from the device.

It will be appreciated that various other information from a mobile device may be stored about the mobile device. Such information may include a MAC address, an operating system, a system configuration, a display resolution, a battery life, etc. Some or all of these items of information may aid the accounting server in identifying a user, or in determining the form of mementos or books to be sent to the user, in some embodiments.

Achievement Database

Referring to FIG. 9, achievement database 236 may store an indication of achievements that may be accomplished by a user. In some embodiments, an achievement itself may be abstracted or separate from a memento or trophy. The latter may constitute a visual embodiment or token that the achievement has been accomplished. In some embodiments, for example, there may be multiple mementos that are available for a given achievement. E.g., a user may customize his trophy for a particular achievement. In some embodiments, a user may select one or more trophies from among a set of available trophies corresponding to a given achievement. For example, trophies may have different colors.

Description field 906 may include the criteria or conditions for accomplishing the achievement. Thus, for example, once a user satisfies the conditions, the user will be deemed to have accomplished the achievement. The user may then become eligible to receive a memento, and/or the user may then become eligible to pursue further achievements. In some embodiments, prerequisite field 908 may store an indication of what achievement or achievements must be earned first before another achievement can be earned.

Book Database

Referring to FIG. 10, book database 240 may store information about various books. The database may store such information as title (field 1006), and author (field 1008). The database may also store classification information (field 1010). Classification information may be relevant to various achievements. For example, to accomplish an achievement, a user may be required to read a certain number of books with a particular classification. Thus, with reference to book database 240, the accounting server may tie particular books a user has read to particular classifications, and determine that a user has indeed read the required number of books of a given classification (or classifications) to merit an achievement designation. As will be appreciated, the title and author may also be used as criteria for an achievement. For example, a user may be required to read a certain number of books by a particular author for an achievement. As another example, a user may be required to read a certain number of books with the word "always" in the title to accomplish an achievement. As will be appreciated, many additional fields and items of information may be stored about a book. In some embodiments, a number of pages, number of chapters, number of words, date of publication, publisher, reading level, or any other information about a book may be stored. Any or all such information may be used in determining whether a particular book will allow a user to accomplish a particular achievement.

User Database on the Library Server

With reference to FIG. 11, user database 328 may be used by the library server 104 to store information about one or more users of the library server. Thus, user database 328 may differ from user database 224, in that the former may pertain to users of the accounting server. The user database 328 may store various information about a user and user profile, such as a name 1106, and other users with which the user is linked or connected (e.g., "friends") 1108. It will be appreciated that various other items of information about a user may be stored.

In some embodiments, user database 328 may include a link to a library source 1110. The library source may represent a source from which the library server may obtain information about the mementos that a user possesses and/or about what achievements the user has accomplishments. Thus, in various embodiments, the library server may receive data from an external server (e.g., the accounting server 102), and may use such data to construct and display the user's library on the user's profile. FIG. 11 depicts an IP address, which may represent the IP address of the accounting server 102, or of another source of information about the user's achievements. It will be appreciated that the library database may store various other links or means of accessing information about user's accomplishments.

In some embodiments, the library may link directly to a user's mobile device. Thus, for example, a user may upload accomplishment information to the library server (e.g., to a social networking site of which he is a member).

In some embodiments, the library server does not actively seek information. Thus, for example, the library server may have no information by which to access the accounting server. In some embodiments, information about a user's accomplishments is "pushed" to the library server (e.g., by the accounting server; e.g., by the user's mobile device).

In various embodiments, the library server 104 and accounting server 102 (or other source of information about a user's accomplishments) may periodically sync up in order that the user's virtual library be kept up to date. Such syncs may occur every hour, every day, or on some other set schedule. In some embodiments, such syncs occur when some user views a given user's virtual library. In some embodiments, such syncs occur when a user accomplishes a new achievement. As will be appreciated, there are various ways by which a user's virtual library may be updated.

Book Database on the Mobile Device

With reference to FIG. 12, book database 424 may be a database of books that is stored on mobile device 106. The book database may include various tracking information about a user's progress through one or more books. For example, a current place field 1206 may indicate the page or chapter in a book where a user last left off reading. The last read field 1208 may indicate the date when a user last read a particular book. This last read information may be used, for example, to remind a user to start reading again if it has been more than a predetermined amount of time.

In some embodiments, a user may be tested on his readings. The test may be used to verify that the user has actually read a book, or portion of a book, and not simply flipped through the pages. A quiz may ask, for example, about the name of a character, the occurrence of an event, the meaning of a certain phrase, or about any other relevant fact. In some embodiments, a user may be required to make a certain score on a quiz, or a certain cumulative score among multiple quizzes, in order to receive credit for having made a reading. In some embodiments, a user who fails to achieve the required score may need to take one or more quizzes again.

In some embodiments, identifying information about a user may be asked of the user before or after commencement of a quiz. For example, the user may be asked to enter a password or other code. This may provide some proof that it is the user taking a quiz, and not some confederate who has already read the book. In some embodiments, a user biometric, such as a fingerprint, may be taken to verify the identity of the user. In some embodiments, a mobile device (e.g., an e-reader) may include hardware and/or software components for receiving and/or processing biometric information. For example, an e-reader may include a fingerprint reader.

Content field 1212 may store the contents of book itself. Content may take the form of words, graphics, tables, chapter markings, or any other relevant content.

Memento Database

Referring to FIG. 13, an exemplary memento database may be used to store information about the mementos earned by a user. Exemplary information may include a date earned (1306), and data about the memento's appearance (1308). The data may include actual image data, for example, and may take the form of an image file. The memento database may be utilized by an e-reader, mobile device, or any other device to track mementos and to display them for a user at appropriate times.

As will be appreciated, the depictions illustrated in the various databases described herein represent some possible data arrangements. Various embodiments contemplate other arrangements of data. For example, each database may have more or fewer fields. Databases may be structured in alternate fashions, and may be linked through various different keys. Information may be consolidated into a single database, a single table, fewer databases or fewer tables. In some embodiments, information may be spread across additional databases or additional tables. In some embodiments, data may be store in various other encodings or formats, including JSON, XML, or any other encoding or format.

As will be appreciated, the data and records described herein represent exemplary data and records. Various embodiments contemplate additional or fewer records. Various embodiments contemplate different ordering of records and fields.

Various embodiments include methods through which e-book users can track their purchases and reading performance by using a personalized trophy/award database. For each title a consumer reads, he/she may earn a small thumbnail designation on his/her profile. For instance, after earning 3 designations resulting from the purchase of 3 Kurt Vonnegut books, the user may be awarded a trophy/award for that action. Several other scenarios may be offered. For example, when the user purchases his/her first Tom Clancy book, a new designation may appear on his/her profile, but it will be dimly colored. As the reader progresses through the novel, the icon will light up in a clockwise pie graph style until entire icon is lit (when the book has been completed).

Several recent marketing and business publications have highlighted the increases in brand loyalty and customer satisfaction which result from having the consumer build value into the product or service he/she is purchasing. In this way, the incentive to complete the various award challenges and earn as many designations as possible may result in customers viewing each purchase as part of a series of actions which are leading to a goal, as opposed to simply considering each purchase a separate affair. This sort of cumulative purchasing perspective may increase purchasing frequency and volume substantially.

Some Embodiments

I. Progress Tracking
  a. Means of tracking
    i. Periodic communication with the server by the user's mobile device.
    ii. Self reporting. In various embodiments, a user may self-report his progress with a book. For example, the user may log into an account with the accounting server and indicate that he has just finished a particular book.
  b. Means of illustrating progress
    i. Pie-shaped icon that fills in as you make progress
    ii. Depiction of a book with more pages turned the further a user gets
  c. Measures of progress
    i. Purchases of the book
    ii. Chapter completion
    iii. Book completion
    iv. Completion of a series of books of a given classification
    v. Making a posting about the book
    vi. Meeting the author
    vii. Meeting at a book club
  d. Prompting a user. In some embodiments, a user may wish for some prompting or prodding in the achievement of an objective. For example, the user may wish to ensure that he accomplishes an achievement within a set period of time. For example, the user may wish to read all American novels of the 17$^{th}$ century by a particular date. Accordingly, the user may set up a schedule by which the user wishes to finish certain numbers of books so as to ensure he is on track to meet his goal. In some embodiments, a prompting schedule is set automatically by e.g., the accounting server or the user's mobile device once the user sets an achievement and/or a date of desired accomplishment.
  i. Schedule of prompts
     1. Prompts may occur on a set schedule and may be independent of a user's progress. For example, if a user is doing well, a prompt might be complimentary, which if a user is behind on his goals, the prompt may be more admonishing in nature.
     2. Prompts may occur based on a user's progress. For example, prompts may occur more frequently if a user is behind on his reading.
     3. A user may customize prompts. For example, a user may say a particular goal is urgent and he wants to be prompted frequently if he is behind.
  ii. Form of prompt
     1. Pop-up message on the user's mobile device. For example, a message may tell the user that he is behind on his reading, and needs to read another 30 pages tonight in order to get on pace to accomplish a particular achievement.
     2. Audio signal. E.g., a tone, chime, musical piece, or other signal may prompt the user.
     3. Synthetic voice.
     4. Actual voice. In some embodiments, a prompt may include an actual recorded voice. In some embodiments, a prompt may be a recording of the author of a particular book, or of some noted authority on books (e.g., a professor of $17^{th}$ century American literature). A user may be encouraged to accomplish his objectives through hearing the actual author's voice.
     5. A prompt may be encouraging or complimentary. For example, a prompt may congratulate a user for being ahead of schedule, or for being among the top 10 percentile of rapid readers.
     6. Prompt to the user's e-reader
     7. Prompt to another device of the user, such as a user pc, cellular phone, or other device. For example, if a user is behind on his reading, he may receive a text message on his cell phone, or an email viewable at his user pc.
  e. Verification of progress
     i. Questionnaire/Quiz. In some embodiments, a user must answer questions about a reading in order to be credited for having read it.
       1. How quizzes are developed
         a. Author creates quizzes
         b. Other readers create quizzes
         c. Quizzes created automatically through AI
     ii. Amount of time spent on a page is at least a certain minimum amount
     iii. Purchase record—e.g., user purchased the book
II. Process of Creating a New Achievement
  a. Who decides to create an achievement
     i. Publisher
     ii. Author
     iii. Book club
     iv. Guru or critic—e.g., Oprah Winfrey
     v. User group, e.g., by voting on the criteria
  b. How are books classified. In various embodiments, users may earn mementos through reading books of certain classification (e.g., legal thrillers, or detective novels). There may be various ways by which books are classified in the first place.
     i. Types of classification
       1. Classified by genre
       2. Classified by author
       3. Classified by topic
       4. Classified by book awards won
     ii. Who classifies books: authors, readers, publishers, gurus, etc.
  c. How a new trophy is created (e.g., the visual embodiment of the achievement)
     i. Use of the book title. E.g., the title is printed within the visual of the trophy
     ii. Use of the book's author
     iii. Image of the printed book's cover
     iv. Submission of entries by users
     v. Chosen by author
     vi. Voted on by users
III. Form of the memento/trophy
  a. On the web
     i. Icon on a social Media Profile—little icon
     ii. Altered avatar appearance—e.g., a user's avatar wears glasses to appear learned
     iii. Listing of user's initials in a forum—e.g., list of all people who have read 10 particular books
  b. On the e-reader
     i. Colored square along the border
     ii. Physical clip-on, e.g., like a refrigerator magnet
IV. Rules for presenting a user's mementos/trophies
  a. Most recent memento is presented first
  b. Rarest memento is presented first
  c. Memento for longest book is presented first
  d. User orders his own mementos
  e. Mementos presented alphabetically by title of book read
  f. Mementos are organized by similar books. E.g., mementos for books of the same author are shown together
  g. Memento that gets most favorable impression from friends is presented first
  h. Present mementos differently according to who is looking
     i. Only certain friends can see your mementos
     ii. Show mementos that match ones your friend has
     iii. Show mementos that your friend doesn't have. For example, this might be to encourage your friend to read a book you read recently.
  i. How are rules made?
     i. Default rules
     ii. User sets rules
V. Presenting available achievements. In some embodiments, a user may be presented with a listing or set of possible achievements he can pursue. The user may be presented with associated mementos/trophies he can earn. In various embodiments, the presentation of possible achievements may be made to the user based on achievements he has already accomplished. For example, if a user has read three books on historic fiction, then the user may be presented with a future possible achievement that involves reading nine books on historic fiction.
VI. How one user can use the mementos of another
  a. In some embodiments, a first user may click on the memento of a second user to automatically purchase the associated book. In some embodiments, upon clicking on the memento, a user is directed to a site (e.g., to Amazon) where he can purchase the associated book.
  b. In some embodiments, a first user may receive a discount on a book if he purchased the book through clicking on a particular memento (or through otherwise initiating a purchase based on a given memento).

c. In some embodiments, a given user may receive a benefit if another user purchases a book based on having seen (or otherwise utilized) the given user's memento. For example, a given user may receive $1 every time another user clicks on his memento and purchases a book. As will be appreciated, many possible benefits may be provided, and are contemplated by various embodiments described herein. Benefits may include monetary benefits, increased recognition, ability to earn additional mementos, discounts on future book purchases, and so on.

VII. Ways of connecting the accounting server with library server. In other words, how does a social networking site (e.g., Facebook) get information about a user's reading accomplishments?

a. Accounting server provides a widget that can be used on other sites b. Accounting server provides an API for use by any library server c. Accounting server does periodic data transfer to the library server d. A user's profile information on the library server comes directly from the user's mobile device. For example, in some embodiments, a user's e-reader may periodically transmit data or messages to a social networking site to update the user's profile with new mementos.

The place, profile, or forum where a user receives recognition may be termed a Memento Library, Memento Collection, MyBookshelf, MyCollection, Reader Scrapbook, MyScrapbook, ReaderRewards, or MyLibrary, in various embodiments.

Types of Awards/Mementos Available

For every purchase under the author category

For every purchase under the genre category

For every 3, 6, 9 purchases from an author in the Awards/Achievements/Mementos category For every 3, 6, 9 purchases from a genre in the Awards/Achievements/Mementos category For every special/limited edition purchase (as designated by the author) in the Awards/Achievements/Mementos category For achieving 2 of the 3 genre awards (one 3 book purchase award for romance novels+one 3 book purchase award for thriller novels=1 award for breadth of purchase genres)

Additional 4, 6, and 8 awards based on the preceding breadth of purchase genres

A "Fast learner" or the like reward for completing two e-books within 7 days

A "Shopping Spree" or the like award for making multiple purchases at once or within a short time period (also increases in level based on the number of purchases—for instance, "Mini Shopping Spree" for 3 books, "Shopping Spree" for 6 books, "Mega Shopping Spree" for 9, and "Ultimate Shopping Spree" for 12 books)

A final "Master" or "Avid Reader" or the like award for achieving all awards available Additional monthly, annual, or other awards which will be offered from time to time Process from the Consumer's Perspective The following is an exemplary process according to various embodiments. A Consumer purchases an e-book through her mobile e-reader device. Once the purchase has been made, Consumer is prompted to decide whether she wants to publicly display this purchase. In various embodiments, Consumer may not want others to know she owns books on certain topics (e.g., controversial topics; e.g., books on the benefits of Botox). Thus, in various embodiments, she can elect to keep such purchases from appearing publicly. In the event Consumer wants to publish her purchase, the service provider (e.g., Kindle, Nook, Kobo, iPad, etc.) transmits that data from their purchase/accounting database to Consumer's library of mementos. This memento library may be based on a pre-existing social networking site (Facebook, LinkedIn, etc.) and may be updated each time Consumer makes a purchase, makes progress within an e-book, and/or when Consumer earns an achievement/award for a specific task. In this way, Consumer can both publicly show others how well read she is and privately reflect on the progress she has made. Thus, Consumer can get the benefit of having a physical bookshelf to display the breadth of her knowledge in a more public setting than her living room.

Process from the Vantage Point of the Accounting Server

A process according to various embodiments may include the following steps. The process may be performed, for example, by the accounting server 102.

Determine an Achievement.

An achievement may be determined in various ways. In some embodiments, an achievement is determined based request. E.g., one or more users may suggest or request that an achievement be established or recognized. In some embodiments, an achievement is established at the request of a book publisher, book author, book authority, or some other entity.

An achievement may consist of a set of rules, steps, and/or criteria which must be met. An achievement may specify a number of books, a classification of books, a number of pages, a number of quiz questions which must be answered, or any other criteria.

In some embodiments, any user is eligible for an achievement. In some embodiments, users must meet certain qualifications. For example, a user must be under a certain age. In this case, the achievement may signify reading a certain number of books at a certain reading level, which may be too easy for adults.

Once an achievement is determined, the existence of the achievement may be published, advertised, broadcast, or otherwise presented. For example, the achievement may be placed in a list or directory of possible achievements. Subsequently a user may access the achievement through the directory when he is looking for a reading goal. In some embodiments, the existence of new achievements is sent to users via messages or alerts.

In some embodiments, unpopular achievements may be retired or deleted. For example, the achievement may no longer be published or presented as one of the possible achievements. This may happen, for example, if less than a predetermined number of users have accomplished the achievement in a predetermined amount of time.

Determine a Memento Associated with the Achievement

A memento may include any visual or other representation of the achievement. In some embodiments, the memento is a graphic. The memento may be an animation, a sound, a tangible item (e.g., a metal medallion), or any other item.

A memento may be created by a graphic designer, artist, computer, photographer, or any other entity. The memento may be created under the direction of an author, literary authority, user, group of users, or any others.

In some embodiments, multiple mementos are created for the same achievement.

Receive User Information

Before tracking a user's reading accomplishments, a relationship may be set up with a user. Information may be received from a user, such as name, reading interests, mobile device owned, or anything else. Account information such as a username, password, and email address may also be requested.

Set Up a User Account

An account may be set up for the user. The account may include a set of information associated with the user. This information may include books purchased, books read, general topics of interest, mementos earned, and so on. The account may be accessible to a user, e.g., to track his own progress, to make new purchases, to self-report progress, to view his mementos, or for any other reason.

Receive an Indication from a User of a Desire to Purchase an E-Book

The accounting server may receive an indication of a desire to purchase an e-book, or to purchase any other material. For example, the user may add a particular e-book to his shopping cart, and may provide a financial account identifier and submit a payment.

Receive an Indication of One or More Rules for Presenting the User's Progress with the E-Book.

The accounting server may receive rules for presenting the user's progress. These may describe how to show other websites (e.g., social networking sites to which the user belongs) how the user is doing. These rules may also include rules for showing or hiding certain items. For example, the user may wish to keep certain purchases private.

Receive an Indication of the User's Progress

The accounting server may receive periodic indications of progress, such as through the self-reporting of the user, or through data transmissions from the user's mobile device, for example.

Determining Whether the has Met the Criteria of the Achievement, Based on the User's Progress Based on the user's indications of progress, the accounting server may determine if the user has met the criteria for an achievement. For example, the server may compare the user's progress to a list of criteria required for a given achievement.

Provide the User with a Memento Based on the Achievement

If the user has successfully accomplished an achievement, the accounting server may provide the appropriate memento. The memento may be posted to the user's account.

Provide an Indication of the User's Memento to a User's Library

The memento may also be posted to the user's account with another server, e.g., with a social networking site server.

Provide an Indication of how the Memento should be Displayed

The accounting server may also indicate how the memento is to be displayed. For example, the accounting server may indicate the order in which two or more of the user's mementos are to be displayed. The indication may be provided to an external site, e.g., to the Library server.

Present to the User an Indication of Future Achievements he Might be Interested in pursuing.

In some embodiments, the accounting server may recommend future achievements to pursue. For example, the future achievements might be achievements that are continuances of those already accomplished (e.g., achievements to read 9 books of a particular genre, rather than 3 already read).

Process from the Perspective of Friends, Family, and Others Who View Consumer's Profile (1) Other Facebook User logs into social network profile. (2) User clicks on the profile of an e-book user. (3) User clicks on the MyLibrary section. 4) A new page/column opens where e-book users chosen accomplishments are displayed, along with the Mybooks and Mybookshelf.

The invention claimed is:

1. A device comprising:
a memory;
a processor, the processor operable to:
  store, in the memory, at least one database comprising text of a plurality of books each in an electronic format, information regarding a user's progress reading at least one of the plurality of books stored in the database, and indications of non-monetary awards earned by a user of the device, wherein at least one of the plurality of books comprises a plurality of pages and chapters of text;
  track a user's reading progress, wherein the user is not connected to an external award server storing a public profile of the user, as the user reads that at least one of the plurality of books and store the reading progress information in the at least one database, wherein reading progress information comprises at least one of a number of: pages read, chapters read, and books read;
  at a time of a next connection to the external award server, determine a first achievement, wherein the first achievement includes completing a set of reading tasks relating to a user's reading progress;
  determine a first non-monetary award associated with the first achievement;
  determine that a first user has completed the first achievement based on the reading progress information tracked by the device;
  direct that the first award be provided to the first user based on the first user completing the first achievement, update the at least one database to include the first non-monetary award in association with the public profile of the user:
  display the first non-monetary award to the first user on the device; and
  sync the first user's achievements with the social networking site by automatically publish the first non-monetary award on a social networking site, the non-monetary award therewith viewable by other users of the social networking site.

2. The device of claim 1 in which the set of reading tasks includes purchasing a set of reading materials.

3. The device of claim 2 in which the set of reading tasks includes purchasing a set of books by the same author.

4. The device of claim 2 in which the set of reading tasks includes purchasing a set of books of the same genre.

5. The device of claim 2 in which the set of reading tasks includes purchasing a third book from a given author.

6. The device of claim 2 in which the set of reading tasks includes purchasing a third book from a given category.

7. The device of claim 1 in which, in determining the first achievement, the processor is operable to determine a set of reading tasks involving reading books sharing a common characteristic.

8. The device of claim 7 in which sharing the common characteristic includes one of: (a) having the same author; (b) being on the same topic; (c) being of the same genre; and (d) having won the same recognition.

9. The device of claim 1 in which, in determining an award, the processor is operable to receive from a publisher an indication of the award.

10. The device of claim 1 in which the processor is further operable to determine that the publisher is a publisher of a book, wherein reading the book is among the set of reading tasks.

11. The device of claim 1 in which, in determining an award, the processor is operable to receive an indication of the award from one of: (a) an author; (b) a representative of a book club; (c) a book critic; and (d) a celebrity.

12. The device of claim 1 in which the non-monetary reward is a memento and in which the at least one database stores mementos that a user has earned.

13. The device of claim 1 in which the set of reading tasks includes reading a portion of the at least one of the plurality of books and in which the processor is further operable to direct that the first award be provided to the first user based on the first user reading the portion of the at least one of the plurality of books.

14. The device of claim 13 in which the set of reading tasks comprises reading a certain number of pages of the at least one of the plurality of books.

15. The device of claim 13 in which the set of reading tasks comprises reading a certain number of chapters of the at least one of the plurality of books.

16. The device of claim 1 in which the processor is further operable to: receive an indication that the first user permits the public display of the non-monetary award.

17. The device of claim 1 in which the processor is further operable to: receive an indication that first user does not permit the public display of a second non-monetary award.

18. The device of claim 1 in which the processor is further operable to: determine a set of achievements that includes the first achievement; and direct the publishing of the set of achievements to a web site.

19. The device of claim 1 in which, in verifying that the first user has made an indicated first progress, the processor is operable to: cause a quiz to be presented to the first user, in which the quiz includes questions related to the set of reading tasks; receive an indication of answers to the quiz provided by the first user; and determine that more than a predetermined number of the answers are correct.

20. The device of claim 19 in which the processor is further operable to: receive a verification of the first user's identity using a biometric or password prior to causing the quiz to be presented to the first user.

21. The device of claim 1 in which, in verifying that the first user has made an indicated first progress, the processor is operable to: receive an indication of the amount of time spent by the first user in making the indicated first progress; and determine that the amount of time is longer than a predetermined amount of time.

22. The device of claim 1 in which the processor is operable to: issue instructions for the presentation to the first user of a pie graph filled to a first percentage corresponding to a first percentage of the first achievement accomplished by the first user.

23. The device of claim 22 in which the processor is further operable to: receive from the first user an indication of a second progress made towards the first achievement; issue instructions for the presentation to the first user of the pie graph filled to a second percentage corresponding to a second percentage of the achievement accomplished by the first user, in which the second percentage is greater than the first percentage.

24. The device of claim 1 in which the processor is operable to: determine a title of a book such that reading the book is among the set of reading tasks; and determine a visual icon that shows the title.

25. The device of claim 1 in which the processor is operable to: determine a genre such that reading books of that genre is the subject of the set of reading tasks; and determine a visual icon that shows the genre.

26. The device of claim 1 in which the processor is operable to: issue instructions for the presentation of the award on a social network page associated with the first user.

27. The device of claim 1 in which the set of reading tasks comprises reading a plurality of books and in which the processor is further operable to direct that the first award be provided to the first user based on the first user reading the plurality of books.

28. The device of claim 1 in which the non-monetary reward is a memento and in which the device is a mobile device coupled over a network to a library server, the server operable to download automatically an indication of a memento to the mobile device.

29. The device of claim 28 in which the library server automatically recognizes the first user for sending mementos to the device based at least on an IP address of the device.

30. The device of claim 1 in which the processor is further operable to push user accomplishments to a library server coupled to the device over a communication network.

31. The device of claim 1 in which the processor is further operable determine progress relative a reading goal and prompt the user when the user is behind on the reading goal.

32. The device of claim 1 in which the processor is further operable to communicate reading progress to at least one server coupled over a network to the device, the at least one server providing an API that allows social networks obtain information regarding reading accomplishments of at least one of the users.

* * * * *